US006968450B1

(12) United States Patent
Rothberg et al.

(10) Patent No.: US 6,968,450 B1
(45) Date of Patent: Nov. 22, 2005

(54) DISK DRIVE CACHING INITIAL HOST REQUESTED DATA IN NON-VOLATILE SEMICONDUCTOR MEMORY TO REDUCE START-UP TIME OF A HOST COMPUTER

(75) Inventors: Michael S. Rothberg, Foothill Ranch, CA (US); Quoc N. Dang, Brea, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 534 days.

(21) Appl. No.: 10/160,682

(22) Filed: Jun. 1, 2002

(51) Int. Cl.⁷ .................. G06F 15/177; G06F 12/00
(52) U.S. Cl. .......................... 713/1; 713/2; 711/113
(58) Field of Search .................. 713/1, 2; 711/103, 711/113; 710/5

(56) References Cited

U.S. PATENT DOCUMENTS

| | | | |
|---|---|---|---|
| 5,155,833 A * | 10/1992 | Cullison et al. ............... 713/2 |
| 5,269,019 A * | 12/1993 | Peterson et al. ............ 707/205 |
| 5,269,022 A | 12/1993 | Shinjo et al. |
| 5,307,497 A | 4/1994 | Feigenbaum |
| 5,448,719 A | 9/1995 | Schultz et al. |
| 5,581,785 A | 12/1996 | Nakamura et al. |
| 5,636,355 A | 6/1997 | Ramakrishnan et al. |
| 5,724,501 A | 3/1998 | Dewey et al. |
| 5,812,883 A * | 9/1998 | Rao ............................. 710/74 |
| 5,832,005 A | 11/1998 | Singh |
| 5,978,922 A | 11/1999 | Arai et al. |
| 6,073,232 A | 6/2000 | Kroeker et al. |
| 6,098,158 A * | 8/2000 | Lay et al. .................... 711/162 |
| 6,101,574 A | 8/2000 | Kumasawa et al. |
| 6,209,088 B1 | 3/2001 | Reneris |
| 6,434,696 B1 * | 8/2002 | Kang ............................. 713/2 |
| 6,449,683 B1 * | 9/2002 | Silvester ..................... 711/103 |
| 6,745,283 B1 * | 6/2004 | Dang ........................... 711/113 |
| 6,807,630 B2 * | 10/2004 | Lay et al. ....................... 713/2 |
| 2001/0039612 A1 | 11/2001 | Lee |
| 2002/0156970 A1 | 10/2002 | Stewart |
| 2003/0212857 A1 | 11/2003 | Pacheco et al. |
| 2004/0003223 A1 | 1/2004 | Fortin et al. |

FOREIGN PATENT DOCUMENTS

JP        6-110786        *   4/1994

OTHER PUBLICATIONS

Office Action dated Jun. 27, 2005, U.S. Appl. Ser. No. 10/185,880, Atty. Docket No. K35A1090 (21 pages).

* cited by examiner

*Primary Examiner*—Chun Cao
(74) *Attorney, Agent, or Firm*—Howard H. Sheerin, Esq.

(57) ABSTRACT

A disk drive is disclosed comprising a disk for storing initial host requested (IHR) data requested by a host computer during a start-up process of the host computer, a head actuated radially over the disk, and a non-volatile semiconductor memory (NVSM) for caching at least part of the IHR data. The disk drive transmits the cached IHR data from the NVSM to the host computer during the start-up process thereby avoiding the delay associated with initializing the mechanics of the disk drive as well as conserving battery power for mobile applications.

22 Claims, 8 Drawing Sheets

CACHE DATA STRUCTURE

| LBA # | NVSM CACHE ADDRESS | REQUESTED DURING START-UP? |
|---|---|---|
| 23 | A034H | YES |
| 12 | 15B6H | YES |
| 09 | 1AD4H | NO |
| 25 | 34C6H | YES |
| 14 | FC4AH | YES |
| 54 | 9A3FH | YES |
| 73 | 45D3H | NO |
| 42 | 10EAH | YES |

CACHE DATA STRUCTURE

| SEQ # | LBA # | NVSM CACHE ADDRESS | START-UP # |
|---|---|---|---|
| 04 | 23 | A034H | 01 |
| 02 | 12 | 15B6H | 01 |
| 07 | 09 | 1AD4H | 02 |
| 03 | 25 | 34C6H | 01 |
| 03 | 14 | FC4AH | 05 |
| 01 | 54 | 9A3FH | 01 |
| 05 | 73 | 45D3H | 03 |
| 06 | 42 | 10EAH | 01 |

FIG. 4B

CACHE DATA STRUCTURE

| SEQ # | LBA # | NVSM CACHE ADDRESS | START-UP # |
|---|---|---|---|
| 04 | 23 | A034H | 01 |
| 02 | 12 | 15B6H | 01 |
| 07 | 09 | 1AD4H | 03 |
| 03 | 25 | 34C6H | 01 |
| 08 | 17 | FC4AH | 01 |
| 01 | 54 | 9A3FH | 01 |
| 05 | 73 | 45D3H | 04 |
| 06 | 42 | 10EAH | 01 |

FIG. 4C

CACHE DATA STRUCTURE

| SEQ # | LBA # | NVSM CACHE ADDRESS | START-UP # |
|---|---|---|---|
| 04 | 23 | A034H | 01 |
| 02 | 12 | 15B6H | 01 |
| 08 | 09 | 1AD4H | 01 |
| 03 | 25 | 34C6H | 01 |
| 07 | 14 | FC4AH | 01 |
| 01 | 54 | 9A3FH | 01 |
| 05 | 73 | 45D3H | 01 |
| 06 | 42 | 10EAH | 01 |

FIG. 4D

CACHE DATA STRUCTURE

| SEQ # | LBA # | NVSM CACHE ADDRESS | START-UP # |
|---|---|---|---|
| 04 | 23 | A034H | 01 |
| 02 | 12 | 15B6H | 01 |
| 05 | 83 | 1AD4H | 01 |
| 03 | 25 | 34C6H | 01 |
| 07 | 14 | FC4AH | 01 |
| 01 | 54 | 9A3FH | 01 |
| 08 | 73 | 45D3H | 01 |
| 06 | 42 | 10EAH | 01 |

FIG. 4E

DISK DRIVE CACHING INITIAL HOST REQUESTED DATA IN NON-VOLATILE SEMICONDUCTOR MEMORY TO REDUCE START-UP TIME OF A HOST COMPUTER

BACKGROUND OF THE INVENTION

1. Field of the Invention

The present invention relates to disk drive for computer systems. More particularly, the present invention relates to a disk drive that caches initial host requested data in non-volatile semiconductor memory to reduce start-up time of a host computer.

2. Description of the Prior Art

Computer systems such as personal computers (PCs) execute an operating system that is typically stored on a disk of a disk drive. When powered on during an operating system (OS) boot, the host computer reads the OS boot data from the disk drive as part of a "start-up" process. In mobile computing applications, such as with laptop computers, the host computer may enter a "hibernation" mode to conserve power by powering down the disk drive and other components. Before entering the hibernation mode an "image" of the host computer's memory representing an operating state (e.g., OS boot data, application data, video graphics data) is 18 stored as a file on the disk drive. When the host computer "wakes" from the hibernation mode the operating state is restored during the start-up process by reading the image file from the disk. Desktop computers may also implement a hibernation mode as disclosed in U.S. Pat. No. 6,209,088 which is incorporated herein by reference.

When the disk drive is powered on (in connection with booting or waking the host computer) the disk drive must perform a mechanical initialization process wherein the disk is spun up to an operating speed and the mechanics calibrated (e.g., calibrating the servo system) before the data stored on the disk can be accessed, creating an undesirable delay during the start-up process. This delay is apparent to the end user in various applications, such as desktop computing, enterprise computing, mobile computing, and game computing. The start-up process also consumes power in mobile applications due to the mechanical components consuming power, such as a voice coil motor actuating a head while reading the initial host requested data from the disk.

There is, therefore, a need to reduce the start-up time of a host computer as well as reduce power consumption in mobile devices employing a hard drive.

SUMMARY OF THE INVENTION

The present invention may be regarded as a disk drive connectable to a host computer, the disk drive comprising a disk for storing initial host requested (IHR) data requested by the host computer during a start-up process of the host computer, a head actuated radially over the disk, and a non-volatile semiconductor memory (NVSM) for caching at least part of the IHR data. The disk drive further comprises a disk controller for performing a mechanical initialization process for the disk drive and for transmitting the IHR data to the host computer during a start-up process. The disk controller enables the disk drive to receive a read command from the host computer before completing the mechanical initialization process. The read command is received from the host computer to read the IHR data, and if the IHR data is cached in the NVSM, the disk controller transmits the cached IHR data from the NVSM to the host computer. If the IHR data is not cached in the NVSM, the disk controller waits for the mechanical initialization process to complete, reads the IHR data from the disk, and transmits the 11 data to the host computer.

In one embodiment, the start-up process begins in connection with an operating system boot of the host computer, and the IHR data comprises operating system boot data. In one embodiment, the IHR data read from the disk is stored in the NVSM.

In one embodiment, the host computer enters a hibernation mode. Prior to entering the hibernation mode, the disk controller stores image data representing an operating state of the host computer in the NVSM in response to a write command received from the host computer. The start-up process begins in connection with the host computer waking from the hibernation mode, and the IHR data comprises the image data.

In one embodiment, the mechanical initialization process comprises a disk spin-up process. In one embodiment, the mechanical initialization process calibrates a servo system for positioning the head radially over the disk.

In one embodiment, the disk controller re-allocates a block of the NVSM if the host computer does not request the IHR data cached in the block of NVSM during the start-up process. In another embodiment, the disk controller re-allocates a block of the NVSM if the host computer does not request the IHR data cached in the block of NVSM after a predetermined number of start-up processes. In yet another embodiment, the IHR data comprises a plurality of blocks requested in a sequence by the host computer during the start-up process, and when the sequence of IHR data blocks requested by the host computer changes, the disk controller re-allocates a block of the NVSM storing the last IHR data block cached in the NVSM in order to cache an earlier requested IHR data block in the NVSM.

In one embodiment, the NVSM stores a cache data structure used by the disk controller to access the NVSM, and the disk controller initializes the cache data structure at the beginning of the start-up process. In one embodiment, the cache data structure comprises a number of entries. Each entry comprises a first field storing a block identifier for identifying an IHR data block, a second field storing a memory address of the NVSM where the IHR data is stored, and a third field indicating whether the IHR data block was requested by the host computer during the start-up process. In one embodiment, the disk controller initializes the cache data structure by resetting the third field in each entry to indicate that none of the IHR data blocks have been requested by the host computer at the beginning of the start-up process. In another embodiment, each entry comprises a sequence number identifying the order in which the IHR data block was requested by the host computer during the start-up process.

The present invention may also be regarded as a method for operating a disk drive during a start-up process for a host computer. The disk drive comprises a disk for storing initial host requested (IHR) data requested by the host computer during the start-up process, a head actuated radially over the disk, and a non-volatile semiconductor memory (NVSM) for caching at least part of the IHR data. The disk drive performs a mechanical initialization process. Before completing the mechanical initialization process, the disk drive is enabled to receive a read command from the host computer to read the IHR data. When the read command is received, if the IHR data is cached in the NVSM, the cached IHR data is transmitted from the NVSM to the host computer. If the IHR data is not cached in the NVSM, the disk drive waits until the mechanical initialization process completes, reads the IHR data from the disk, and transmits the IHR data to the host computer.

BRIEF DESCRIPTION OF THE DRAWINGS

FIG. 4B shows a cache data structure according to an embodiment of the present invention further comprising a sequence number identifying the order in which the OS boot data blocks are requested and a start-up number indicating the number of times an OS boot data block was not requested over a number of start-up processes.

FIG. 4C illustrates how in one embodiment the memory storing an OS boot data block not requested by the host computer after a predetermined number of start-up processes is re-allocated to store a missed OS boot data block.

FIGS. 4D–4E illustrates how in one embodiment the memory storing an OS boot data block requested last in the start-up process is re-allocated to store an OS boot data block requested earlier in the boot process.

DESCRIPTION OF THE PREFERRED EMBODIMENTS

Figure 1A:
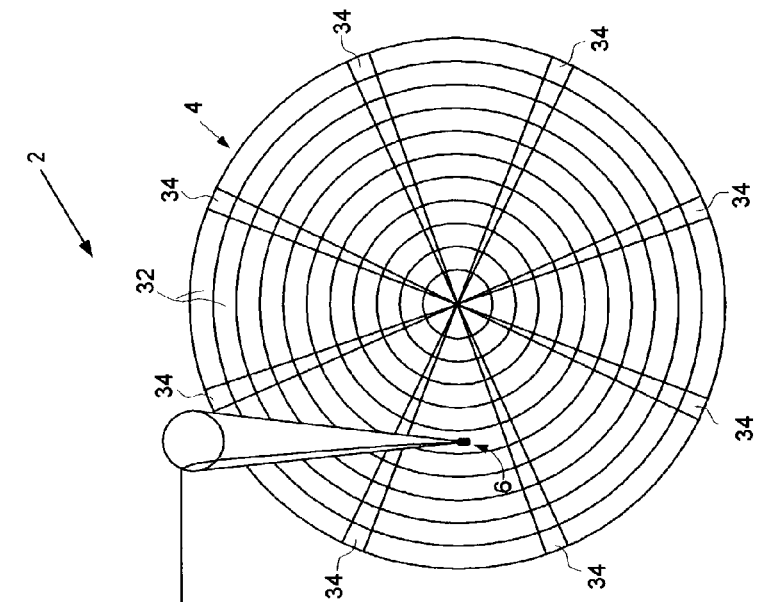
FIG. 1A shows a disk drive according to an embodiment of the present invention for storing IHR data in a non-volatile semiconductor memory transmitted to a host computer to expedite a start-up process.
Figure 1B:
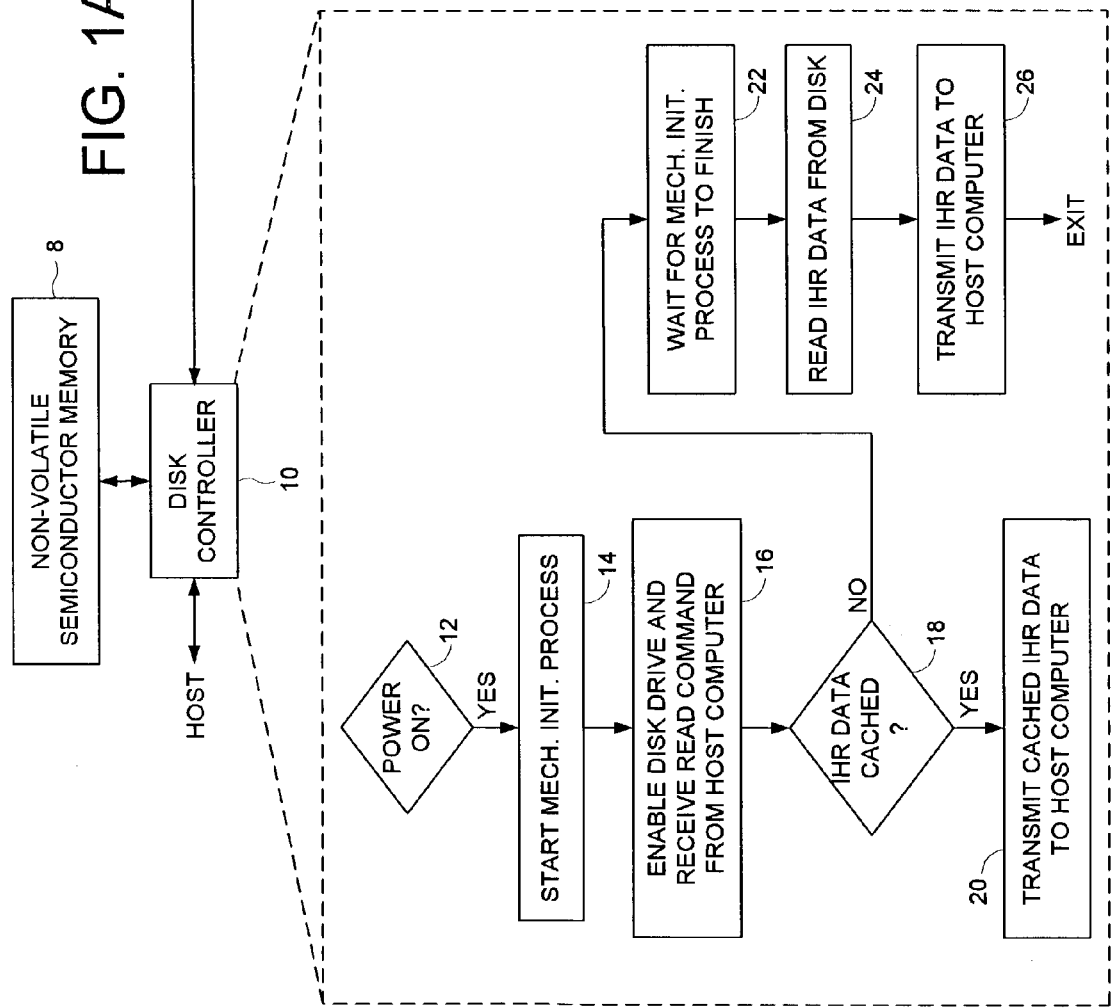
FIG. 1B is a flow diagram illustrating the steps executed by a disk controller for transmitting the IHR data to the host computer during the start-up process according to an embodiment of the present invention.

FIG. 1A shows a disk drive 2 connectable to a host computer according to an embodiment of the present invention. The disk drive 2 comprises a disk 4 for storing initial host requested (IHR) data requested by the host computer during a start-up process of the host computer, a head 6 actuated radially over the disk 4, and a non-volatile semiconductor memory 8 (NVSM) for caching at least part of the IHR data. The disk drive 2 further comprises a disk controller 10 for performing a mechanical initialization process for the disk drive 2 and for transmitting the IHR data to the host computer during the start-up process. FIG. 1B is a flow diagram illustrating the steps executed by the disk controller 10 during the start-up process according to an embodiment of the present invention. When the disk drive is powered on at step 12, the disk controller 10 starts the mechanical initialization process at step 14. At step 16 the disk controller 10 enables the disk drive to receive a read command and receives the read command from the host computer to read the IHR data before completing the mechanical initialization process. If at step 18 the IHR data is cached in the NVSM 8, at step 20 the disk controller 10 transmits the cached IHR data from the NVSM 8 to the host computer. If at step 18 the IHR data is not cached in the NVSM 8, at step 22 the disk controller 10 waits for the mechanical initialization process to complete. At step 24 the disk controller 10 reads the IHR data from the disk 4, and at step 26 transmits the IHR data to the host computer.

In FIG. 1B, the disk drive 2 is enabled to receive a read command from the host computer after starting the mechanical initialization process. In an alternative embodiment, the disk drive 2 is enabled to receive a read command from the host computer after completing at least part of an electrical initialization process but before starting the mechanical initialization process. In both embodiments, if the IHR data is cached in the NVSM 8 the read command is serviced immediately thereby avoiding the delay associated with waiting for the mechanical initialization process to complete.

In the embodiment of FIG. 1A, the disk 4 comprises a plurality of radially-spaced, concentric tracks 32 where each track 32 is partitioned into a plurality of data sectors. Each track 32 also comprises a plurality of embedded servo sectors 34 recorded at a periodic interval around the circumference of the track 32. Each embedded servo sector 34 comprises coarse head positioning information (e.g., a track number) processed by the disk controller 10 to position the head 6 over a target track, and fine head positioning information (e.g., servo bursts) processed by the disk controller 10 to maintain the head 6 over a centerline of the target track during read and write operations. The NVSM 8 may comprise any suitable semiconductor memory which retains its contents when powered off, such as FLASH, FRAM, MRAM, or non-volatile RAM (NVRAM). NVRAM may be preferred since it allows for an essentially unlimited number of rewrite cycles. An example of a suitable NVRAM is a battery backed SRAM, such as component DS1270Y from Maxim Integrated Products, Inc., in Sunnyvale, Calif. Another example of a suitable NVRAM is an SRAM that uses an EEPROM to save the contents of the SRAM when power is turned off. In one embodiment, the NVSM 8 is integrated with other components, such as the disk controller 10, into a single integrated circuit (IC).

Figure 2:
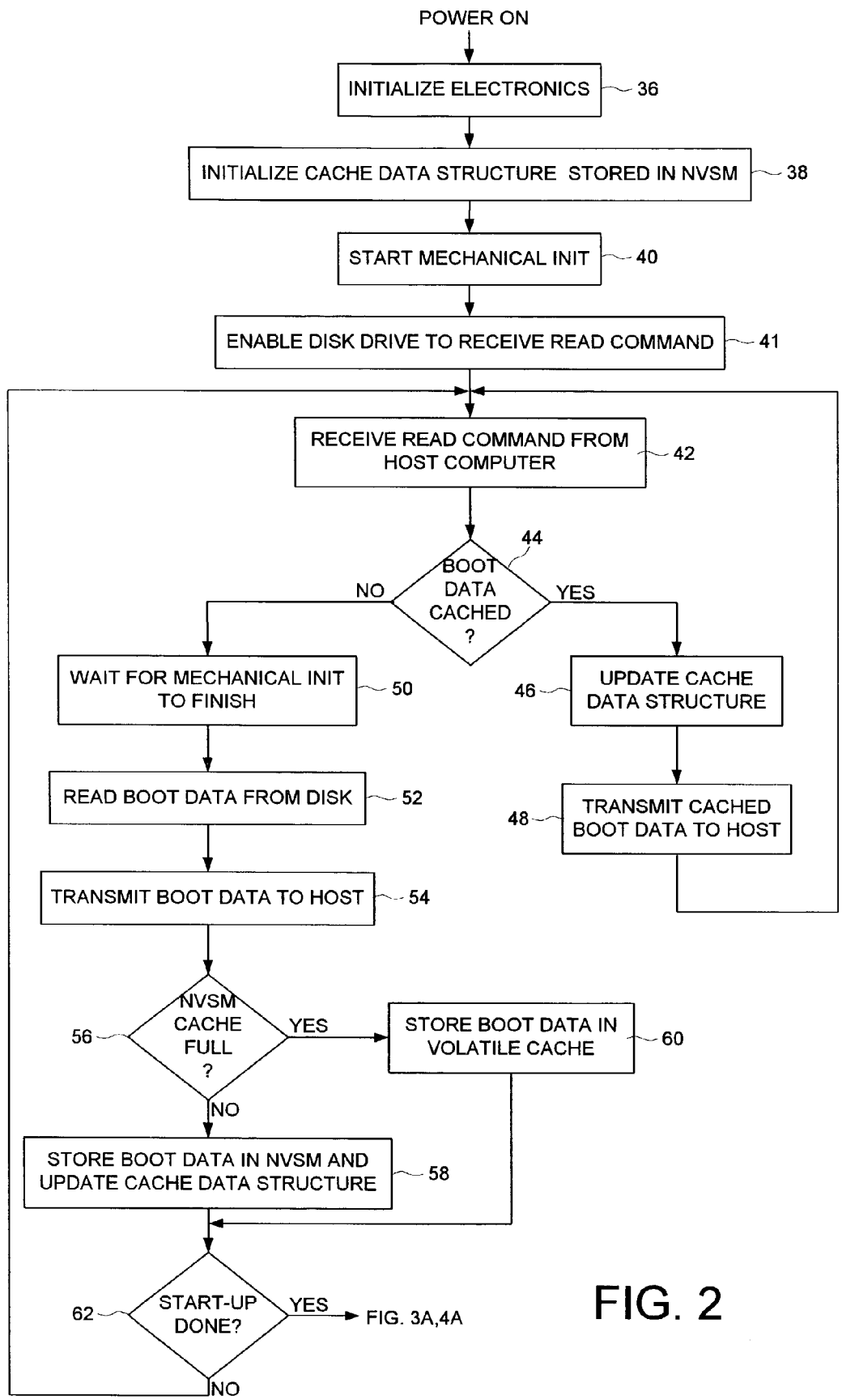
FIG. 2 is a more detailed flow diagram illustrating the steps executed by the disk controller for transmitting the IHR data comprising OS boot data to the host computer during the start-up process according to an embodiment of the present invention.

In one embodiment, the start-up process begins in connection with an operating system (OS) boot of the host computer and the IHR data comprises OS boot data. This embodiment expedites the boot process for the host computer by avoiding the delay associated with the mechanical initialization process. FIG. 2 is a diagram illustrating the steps executed by the disk controller 10 for transmitting the cached OS boot data to the host computer during the boot process according to an embodiment of the present invention. The disk controller 10 may comprise a plurality of components, such as a microprocessor, servo controller, read/write channel, etc., which are implemented in one or more integrated circuits. When the host computer 11 and disk drive 2 are powered on, the electronics (disk controller 10, NVSM 8, etc.) are initialized at step 36, a cache data structure stored in the NVSM 8 is initialized at step 38, and the mechanical initialization process is started at step 40. The mechanical initialization process may include a disk spin-up process and a servo control calibration process. The servo control calibration process may calibrate parameters for optimal seek trajectories, head-offset between disk surfaces, or other parameters involved with positioning the head 6 over the disk 4.

After starting the mechanical initialization process at step 40, at step 41 the disk drive 2 is enabled to receive a read command from the host computer. At step 42 the disk drive 2 receives the read command from the host computer to read IHR data which in this embodiment is OS boot data. If at step 44 the OS boot data is cached in the NVSM 8 as determined from the cached data structure initialized at step 38, then at step 46 the disk controller 10 updates the cache data structure and at step 48 transmits the cached OS boot data to the host computer. If at step 44 the OS boot data is not cached in the NVSM 8, then at step 50 the disk controller 10 waits for the mechanical initialization process to complete. Once the mechanical initialization process completes, the disk controller 10 can access the disk 4 and therefore reads the OS boot data from the disk 4 at step 52 and at step 54 transmits the OS boot data to the host computer.

If at step 56 the NVSM cache is not full, then at step 58 the OS boot data is stored in the NVSM 8 and the cached data structure is updated to reflect the addition. If the NVSM cache is full at step 56, then at step 60 the OS boot data read from the disk 4 is stored in a volatile semiconductor memory (e.g., a DRAM), and as described below, may be inserted into the NVSM cache according to a replacement policy. This process of receiving read commands from the host and transmitting OS boot data from either the NVSM 8 or the disk 4 is repeated until the start-up process finishes at step 62. In one embodiment the start-up process is considered finished after receiving requests to read a number of sectors equal to the capacity of the NVSM cache. In an alternative embodiment, the start-up process is considered finished after a predetermined number of sectors have been requested from the host computer following the power on event. In one embodiment, the NVSM cache is implemented as an extension to the normal read cache. In this manner if the host computer requests a sector during normal operation that is cached in the NVSM 8, the cached sector will be transmitted to the host computer to avoid the latency of the disk drive mechanics in reading the sector from the disk 4. Similarly, if the host computer performs a write operation to a cached sector, the cached sector stored in the NVSM 8 is updated together with the sector stored on the disk 4.

Figures 3A, 3B:
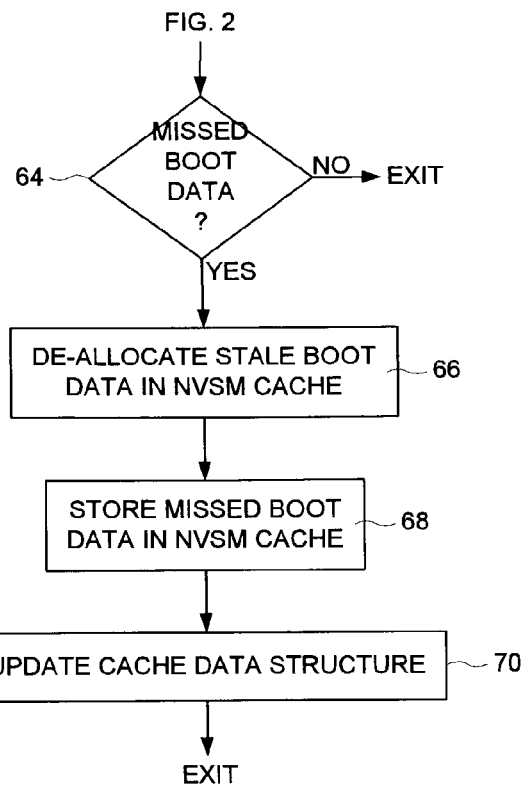
FIG. 3A is a flow diagram according to an embodiment of the present invention wherein the disk controller re-allocates memory storing an OS boot data block not requested during the start-up process to store a missed OS boot data block requested during the start-up process.
FIG. 3B shows a cache data structure according to an embodiment of the present invention comprising a plurality of entries for storing an identifier identifying an OS boot data block, a memory address where the OS boot data block is stored in the NVSM, and a flag indicating whether the OS boot data block was requested during a start-up process.

FIG. 3A is a flow diagram according to an embodiment of the present invention wherein the disk controller 10 re-allocates a block of the NVSM 8 if the host computer does not request the OS boot data cached in the block of NVSM 8 during the start-up process. Referring again to FIG. 2, if at step 44 the requested OS boot data is not cached, then after reading the OS boot data from the disk 4 it is stored in the volatile memory at step 60 and marked as a "missed" OS boot data block. If at step 64 of FIG. 3A there are missed OS boot data blocks stored in the volatile memory, then at step 66 the disk controller 10 de-allocates "stale" OS boot data blocks from the NVSM cache (cached OS boot data blocks not requested during the start-up process), and at step 68 replaces each, stale OS boot data block with a missed OS boot data block. At step 70 the cache data structure is updated to reflect the change to the NVSM cache. In one embodiment, the cached OS boot data blocks are updated "in line" at step 60 of FIG. 2 rather than deferred until after the start-up process finishes.

FIG. 3B shows a cache data structure according to an embodiment of the present invention comprising a plurality of entries for storing an identifier identifying an OS boot data block (e.g., a logical block address (LBA)), a memory address where the OS boot data block is stored in the NVSM 8, and a flag indicating whether the OS boot data block was requested during a start-up process. Referring again to FIG. 2, the disk controller 10 initializes the cached data structure at step 38 by setting the flag in each entry to "NO" indicating that the OS boot data block has not yet been requested at the beginning of the start-up process. If a cached OS boot data block is requested by the host computer during the start-up process, then at step 46 of FIG. 2 the disk controller 10 sets the flag to "YES". If after a start-up process there are missed OS boot data blocks stored in the volatile semiconductor memory, then the OS boot data blocks not requested during the start-up process are replaced with missed OS boot data blocks. Referring to FIG. 3B, OS boot data blocks 09 and 73 storing stale OS boot data would be replaced with missed OS boot data blocks after the start-up process. In one embodiment, the missed OS boot data blocks requested earliest in the start-up process are selected to replace the stale OS boot data blocks in the NVSM 8.

Figure 4A:
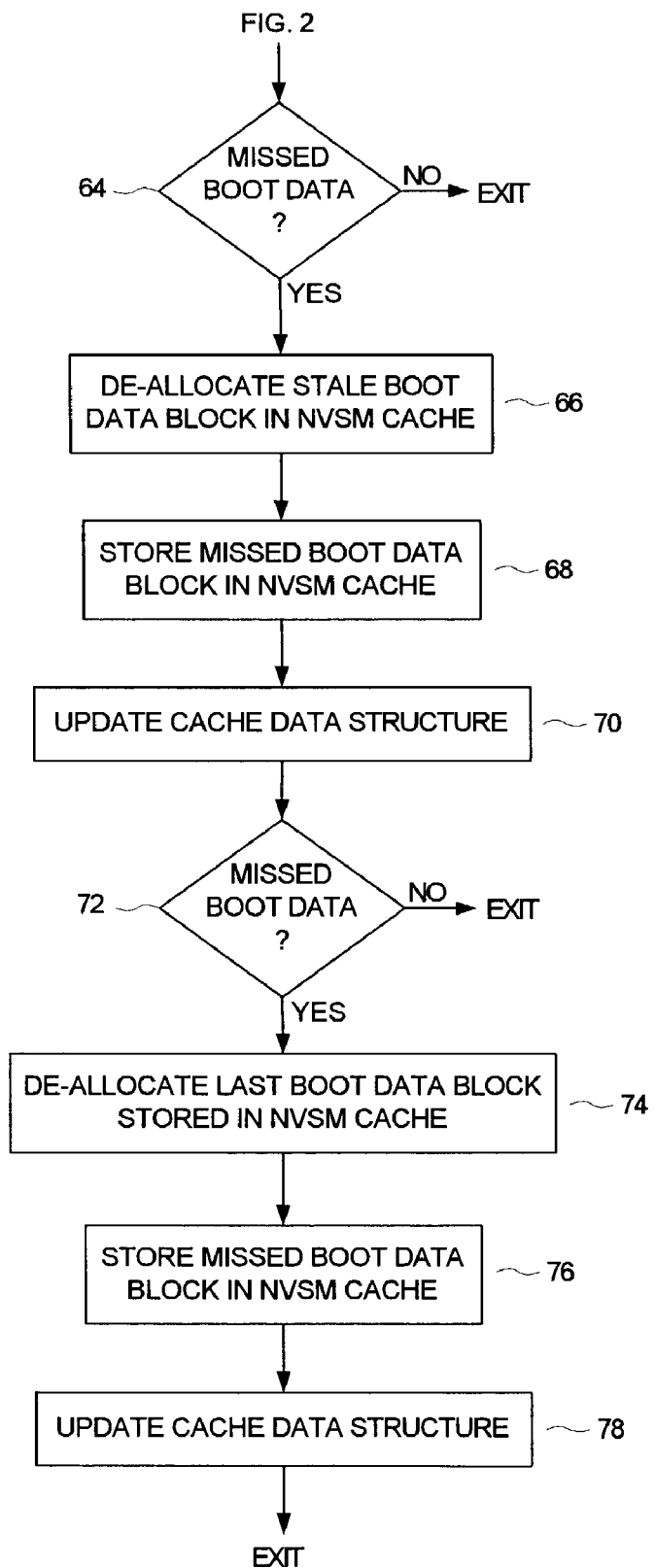
FIG. 4A is a flow diagram according to an embodiment of the present invention wherein the disk controller re-allocates memory storing an OS boot data block not requested after a predetermined number of start-up processes, or requested last in the start-up sequence.

FIG. 4A is a flow diagram according to an embodiment of the present invention wherein the disk controller 10 re-allocates memory storing OS boot data blocks not requested by the host computer after a predetermined number of start-up processes, or requested last in the start-up sequence to store missed OS boot data blocks requested earlier in the start-up sequence. If at step 64 there are missed OS boot data blocks stored in the volatile semiconductor memory, then at step 66 stale OS boot data blocks are de-allocated from the NVSM cache. A stale OS boot data block in this embodiment is an OS boot data block not requested after a predetermined number of start-up processes. At step 68, the disk controller 10 replaces stale OS boot data blocks with missed OS boot data blocks in the NVSM cache, and at step 70 the disk controller 10 updates the cache data structure to reflect the change to the NVSM cache. If after replacing all of the stale OS boot data blocks there is still more missed OS boot data blocks at step 72, then at step 74 the disk controller 10 de-allocates OS boot data blocks requested last in the start-up sequence relative to missed OS boot data blocks requested earlier in the start-up sequence. At step 76 the disk controller 10 stores missed OS boot data blocks requested earlier in the start-up sequence in place of the latest OS boot data blocks de-allocated in the NVSM cache, and at step 78 the disk controller 10 updates the cache data structure to reflect the change to the NVSM cache. By storing the OS boot data blocks requested earliest in the start-up process a cache miss will not occur until all of the OS boot data blocks stored in the NVSM cache have been transmitted to the host computer.

FIG. 4B shows a cache data structure according to an embodiment of the present invention comprising a sequence number identifying the order in which the OS boot data is requested and a start-up number indicating the number of times an OS boot data block was not requested over a number of start-up processes. Referring again to FIG. 2, at step 38 the disk controller 10 initializes the cache data structure by incrementing the start-up number in each entry of the cache data structure. When a cached OS boot data block is requested by the host computer during the start-up process, at step 46 the disk controller 10 resets the corresponding start-up number for the entry in the cache data structure to 01. If the start-up number for an entry exceeds a threshold, indicating that the OS boot data block has not been requested for a predetermined number of start-up processes, the OS boot data block is marked as stale. Referring to FIG. 4B, OS boot data block 14 has not been requested over five boot processes, therefore it is marked as stale. As shown in FIG. 4C, OS boot data block 14 is replaced with missed OS boot data block 17 at step 68 of FIG. 4A.

FIGS. 4D–4E illustrate how in one embodiment the block of NVSM cache storing an OS boot data block requested last in the start-up sequence is re-allocated to store an OS boot data block requested earlier in the start-up sequence. In the example shown, eight OS boot data blocks are stored in the NVSM cache corresponding to the most recent start-up process. The sequence number in each entry of the cache data structure indicates the order in which the OS boot data blocks were requested during the start-up process. During a subsequent start-up process shown in FIG. 4E, the start-up sequence requested by the host computer changes and OS boot data block 83 is flagged as missed at step 60 of FIG. 2. After the start-up process completes, OS boot data block 09 in FIG. 4D is replaced with OS boot data block 83 as shown in FIG. 4E because OS boot data block 83 was requested earlier in the start-up sequence than OS boot data block 09.

Figure 5:
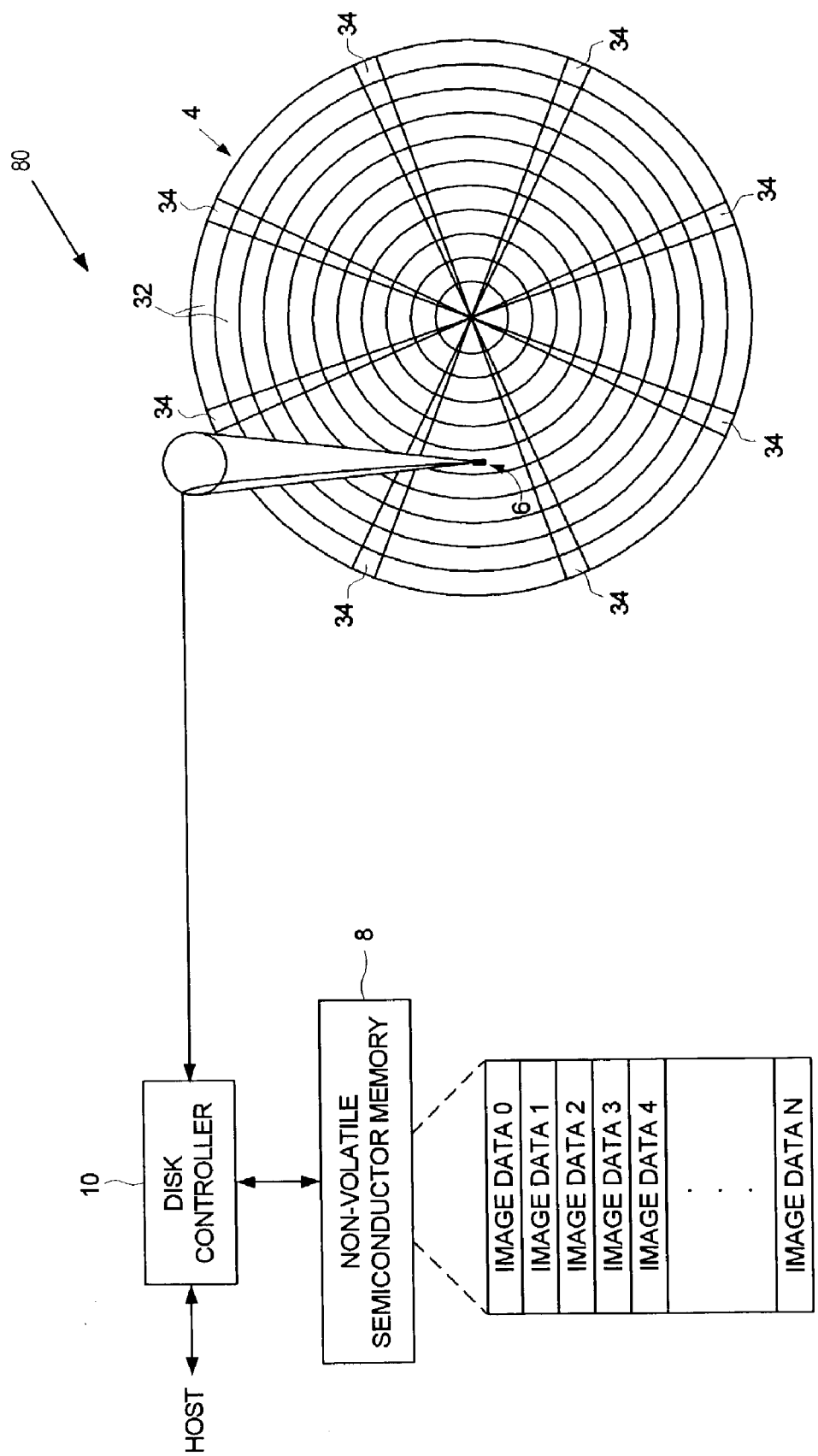
FIG. 5 is a disk drive according to an embodiment of the present invention wherein an image of the host computer's memory is stored in the NVSM and used to quickly restore the host computer after waking from a hibernation mode.

FIG. 5 shows a disk drive 80 according to an embodiment of the present invention wherein an image of the host computer's memory is stored in the NVSM 8 and used to quickly restore the host computer after waking from a hibernation mode. In this embodiment, the host computer (e.g., a laptop computer) enters a hibernation mode, but before entering the hibernation mode, image data representing an operating state of the host computer (e.g., OS boot data, application data, video graphics data, etc.) is stored in the NVSM 8. The start-up process begins after the host computer wakes from the hibernation mode and the disk drive 80 is powered on. The image data cached in the NVSM 8 is transmitted as the IHR data to significantly reduce the start-up time. In one embodiment, a number of LBAs are reserved for storing the image data (e.g., the BIOS issuing a command which configures a hidden partition for the disk drive 80). This enables the host computer to interface with the disk drive 80 in a conventional manner as if the image data were being stored as a file on the disk 4 of the disk drive 80. When the disk controller 10 receives a write command to write to the LBAs reserved for the image data, the disk controller 10 stores the image data in the NVSM 8. During the start-up process, when the disk controller 10 receives a read command to read from the LBAs reserved for the image data, the disk controller 10 returns the image data stored in the NVSM 8 which reduces the start-up time and conserves power. This embodiment further reduces power consumption in mobile applications where the disk 4 may be spun down during an idle mode. When the host computer enters the hibernation mode, the image data is stored in the NVSM 8 which avoids spinning up the disk 4 from the idle mode and actuating the head 6 in order to store the image data on the disk 4.

Figure 6:
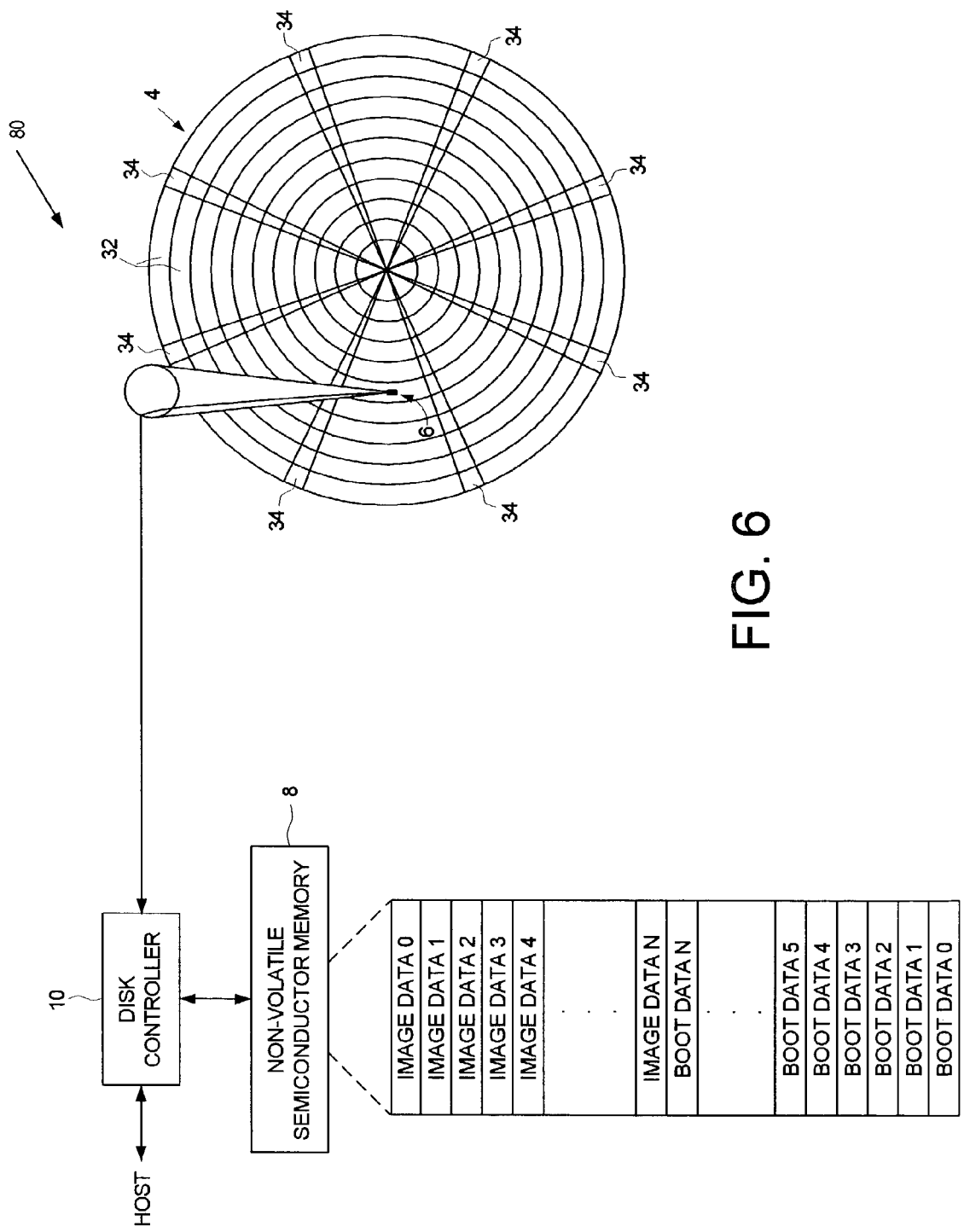
FIG. 6 is a disk drive according to an embodiment of the present invention wherein the NVSM caches both image data to expedite waking from a hibernation mode as well as OS boot data to expedite an operating system boot of the host computer.

FIG. 6 shows an embodiment of the present invention wherein the NVSM 8 caches both image data to expedite waking from a hibernation mode as well as OS boot data to expedite an operating system boot of the host computer. When the host computer enters the hibernation mode, the image data is stored in the NVSM cache by replacing the OS boot data blocks requested last in the start-up sequence of an operating system boot. Preserving the earliest requested OS boot data blocks in the NVSM cache defers a cache miss during the operating system boot which allows the mechanical initialization process to proceed concurrently with transmitting the cached OS boot data blocks to the host computer.

Caching IHR data in the NVSM 8 expedites waking from a hibernation mode as well as an operating system boot by avoiding the delay in waiting for the mechanical initialization process to finish. The cached IHR data stored in the NVSM 8 can be transmitted to the host computer immediately after a power on event (after initializing the electronics) and during the mechanical initialization process. If enough IHR data is cached, the delay associated with initializing the mechanics of the disk drive will not effect the start-up time perceived by the end user. In addition, caching the IHR data in the NVSM 8 conserves battery power in mobile applications since it takes less power to transmit an IHR data block cached in the NVSM 8 as compared to reading the IHR data block from the disk 4.

We claim:

1. A disk drive connectable to a host computer, the disk drive comprising:
   (a) a disk for storing initial host requested (IHR) data requested by the host computer during a start-up process of the host computer;
   (b) a head actuated radially over the disk;
   (c) a non-volatile semiconductor memory (NVSM) for caching at least part of the IHR data; and
   (d) a disk controller for performing a mechanical initialization process for the disk drive and for transmitting the IHR data to the host computer during the start-up process by:
      enabling the disk drive to receive a read command from the host computer before completing the mechanical initialization process;
      receiving the read command from the host computer to read the IHR data;
      if the IHR data is cached in the NVSM, transmitting the cached IHR data from the NVSM to the host computer; and
      if the IHR data is not cached in the NVSM:
         waiting for the mechanical initialization process to complete;
         reading the IHR data from the disk; and
         transmitting the IHR data to the host computer, wherein:
         the start-up process begins in connection with an operating system boot of the host computer;
         the IHR data comprises operating system boot data;
         the IHR data comprises a plurality of IHR data blocks requested in a sequence by the host computer during the start-up process; and
         when the sequence of IHR data blocks requested by the host computer changes, the disk controller re-allocates a block of the NVSM storing a later requested IHR data block cached in the NVSM in order to cache an earlier requested IHR data block in the NVSM.

2. The disk drive as recited in claim 1, wherein the IHR data read from the disk is stored in the NVSM.

3. The disk drive as recited in claim 1, wherein:
   (a) the host computer enters a hibernation mode;
   (b) prior to entering the hibernation mode, the disk controller stores image data representing an operating state of the host computer in the NVSM in response to a write command received from the host computer;

(c) the start-up process begins in connection with the host computer waking from the hibernation mode; and (d) the IHR data comprises the image data.

4. The disk drive as recited in claim 1, wherein the mechanical initialization process comprises a disk spin-up process.

5. The disk drive as recited in claim 1, wherein the mechanical initialization process calibrates a servo system for positioning the head radially over the disk.

6. The disk drive as recited in claim 1, wherein the disk controller re-allocates a block of the NVSM if the host computer does not request the IHR data cached in the block of NVSM during the start-up process.

7. The disk drive as recited in claim 1, wherein the disk controller re-allocates a block of the NVSM if the host computer does not request the IHR data cached in the block of NVSM after a predetermined number of start-up processes.

8. The disk drive as recited in claim 1, wherein:

(a) the NVSM stores a cache data structure used by the disk controller to access the NVSM; and (b) the disk controller initializes the cache data structure at the beginning of the start-up process.

9. The disk drive as recited in claim 8, wherein the cache data structure comprises a number of entries, wherein each entry comprises:

(a) a first field storing a block identifier for identifying an IHR data block;

(b) a second field storing a memory address of the NVSM where the IHR data block is stored; and (c) a third field indicating whether the IHR data block was requested by the host computer during the start-up process.

10. The disk drive as recited in claim 9, wherein the disk controller initializes the cache data structure by resetting the third field in each entry to indicate that none of the IHR data blocks have been requested by the host computer at the beginning of the start-up process.

11. The disk drive as recited in claim 9, wherein each entry further comprises a sequence number identifying the order in which the IHR data block was requested by the host computer during the start-up process.

12. A method of operating a disk drive during a start-up process for a host computer, the disk drive comprising a disk for storing initial host requested (IHR) data requested by the host computer during the start-up process, a head actuated radially over the disk, and a non-volatile semiconductor memory (NVSM) for caching at least part of the IHR data, the disk drive performing a mechanical initialization process, the method comprising the steps of:

(a) enabling the disk drive to receive a read command from the host computer before completing the mechanical initialization process;

(b) receiving the read command from the host computer to read the IHR data;

(c) if the IHR data is cached in the NVSM, transmitting the cached IHR data from the NVSM to the host computer; and (d) if the IHR data is not cached in the NVSM:
waiting for the mechanical initialization process to complete;
reading the IHR data from the disk; and
transmitting the IHR data to the host computer wherein:
the start-up process begins in connection with an operating system boot of the host computer;

the IHR data comprises operating system boot data;

the IHR data comprises a plurality of IHR data blocks requested in a sequence by the host computer during the start-up process; and when the sequence of IHR data blocks requested by the host computer changes, further comprising the step of re-allocating a block the NVSM storing the last IHR data block cached in the NVSM in order to cache an earlier requested IHR data block in the NVSM.

13. The method as recited in claim 12, wherein the IHR data read from the disk is stored in the NVSM.

14. The method as recited in claim 12, wherein the host computer enters a hibernation mode, further comprising the steps of:

(a) prior to entering the hibernation mode, storing image data representing an operating state of the host computer in the NVSM in response to a write command received from the host computer; and (b) beginning the start-up process in connection with the host computer waking from the hibernation mode, wherein the IHR data comprises the image data.

15. The method as recited in claim 12, wherein the mechanical initialization process comprises a disk spin-up process.

16. The method as recited in claim 12, wherein the mechanical initialization process calibrates a servo system for positioning the head radially over the disk.

17. The method as recited in claim 12, further comprising the step of re-allocating a block of the NVSM if the host computer does not request the IHR data cached in the block of NVSM during the start-up process.

18. The method as recited in claim 12, further comprising the step of re-allocating a block of the NVSM if the host computer does not request the IHR data cached in the block of NVSM after a predetermined number of start-up processes.

19. The method as recited in claim 12, further comprising the steps of:

(a) storing a cache data structure in the NVSM used to access the NVSM; and (b) initializing the cache data structure at the beginning of the start-up process.

20. The method as recited in claim 19, wherein the cache data structure comprises a number of entries, wherein each entry comprises:

(a) a first field storing a block identifier for identifying an IHR data block;

(b) a second field storing a memory address of the NVSM where the IHR data block is stored; and (c) a third field indicating whether the IHR data block was requested by the host computer during the start-up process.

21. The method as recited in claim 20, wherein the step of initializing the cache data structure comprises the step of resetting the third field in each entry to indicate that none of the IHR data blocks have been requested by the host computer at the beginning of the start-up process.

22. The method as recited in claim 20, wherein each entry further comprises a sequence number identifying the order in which the IHR data block was requested by the host computer during the start-up process.

* * * * *